(12) United States Patent
Aljanabi et al.

(10) Patent No.: US 11,170,584 B2
(45) Date of Patent: Nov. 9, 2021

(54) AUTOMATIC FAULT ISOLATION AND DIAGNOSIS SYSTEM USING OVER-THE-AIR TECHNOLOGY

(71) Applicant: GM Global Technology Operations LLC, Detroit, MI (US)

(72) Inventors: Issa Aljanabi, Ann Arbor, MI (US); Xinyu Du, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 16/253,714

(22) Filed: Jan. 22, 2019

(65) Prior Publication Data

US 2020/0234513 A1    Jul. 23, 2020

(51) Int. Cl.
*G07C 5/08* (2006.01)
*G07C 5/00* (2006.01)
*H04W 4/44* (2018.01)

(52) U.S. Cl.
CPC ........... *G07C 5/008* (2013.01); *G07C 5/0808* (2013.01); *H04W 4/44* (2018.02)

(58) Field of Classification Search
CPC ........ G07C 5/008; G07C 5/0808; H04W 4/44
See application file for complete search history.

(56) References Cited

U.S. PATENT DOCUMENTS

| 2013/0054082 | A1* | 2/2013 | Costantino | G05B 23/0272 |
| | | | | 701/29.6 |
| 2014/0074345 | A1* | 3/2014 | Gabay | G07C 5/08 |
| | | | | 701/31.4 |
| 2018/0040172 | A1* | 2/2018 | Funk | H04W 76/30 |
| 2018/0058413 | A1 | 3/2018 | Jiang et al. | |
| 2019/0007490 | A1* | 1/2019 | Lindoff | H04L 67/2847 |
| 2019/0052522 | A1* | 2/2019 | Makkiya | H04L 41/069 |
| 2019/0088043 | A1* | 3/2019 | Henson | G07C 5/0841 |
| 2020/0153967 | A1* | 5/2020 | Cermak | G06F 21/45 |

\* cited by examiner

*Primary Examiner* — Hunter B Lonsberry
*Assistant Examiner* — Matthew J. Reda
(74) *Attorney, Agent, or Firm* — Vivacqua Crane, PLLC

(57) ABSTRACT

An automatic fault isolation and diagnosis system includes a cloud-based data system having multiple machine-readable troubleshooting procedures stored therein. A vehicle fault code is generated by one of multiple vehicle control devices of a vehicle platform. The fault code defines an issue with at least one system or component of the vehicle platform. A data transfer device within the vehicle platform receives the fault code and forwards the fault code to the cloud-based data system. The fault code is received and analyzed in the cloud-based data system to initially determine if the fault code is directed to and can be automatically corrected by one of the stored machine-readable troubleshooting procedures.

15 Claims, 2 Drawing Sheets

AUTOMATIC FAULT ISOLATION AND DIAGNOSIS SYSTEM USING OVER-THE-AIR TECHNOLOGY

INTRODUCTION

The present disclosure relates to vehicle platform system troubleshooting using wireless or over-the-air transmission of fault codes.

Certain vehicle platform problematics issues are currently manifested using a malfunction indication light (MIL) so the driver can see the illuminated MIL and take the vehicle to a service facility for troubleshooting the vehicle and to repair the fault. In certain cases some MIL lights are not intuitive to the driver. In particular known engine MIL lights such as check engine MIL lights when illuminated could have many root causes attributed to a variety of propulsion system parts and components. There is therefore a need for additional analysis and MIL light fault code interpretation to assess the criticality and severity level of such MIL faults so the vehicle driver can take the appropriate action. Known electronic control unit (ECU) physical resources available in the vehicle have only limited capability to host all of the necessary analyses and to troubleshoot machine readable test procedures, therefore known ECU physical resources available in the vehicle are insufficient to provide the necessary information to the driver.

Thus, while current vehicle platform warning systems using malfunction indication lights (MILs) achieve their intended purpose, there is a need for a new and improved system and method for identifying vehicle malfunctions which are more driver intuitive and useful.

SUMMARY

According to several aspects, an automatic fault isolation and diagnosis system includes a cloud-based data system having multiple machine-readable troubleshooting procedures stored therein. A vehicle fault code is generated by one of multiple vehicle control devices of a vehicle platform, the fault code defining an issue with at least one system or component of the vehicle platform. A data transfer device within the vehicle platform receives the fault code and forwards the fault code to the cloud-based data system. The fault code is received and analyzed in the cloud-based data system to initially determine if the fault code is associated with one of the stored machine troubleshoot procedures and can be automatically isolated by one of the stored machine-readable troubleshooting procedures.

In another aspect of the present disclosure, a comparator is included, wherein if one of the machine-readable troubleshooting procedures is related to the fault code the comparator identifies if the issue from which the fault code was generated defines a critical issue.

In another aspect of the present disclosure, a machine-readable procedure defining a copy of the one of the machine-readable troubleshooting procedures together with the fault code is created if the fault code defines the critical issue. The machine-readable procedure is forwarded to the data transfer device by the comparator.

In another aspect of the present disclosure, a gateway device is included, wherein the machine-readable procedure is transferred by the data transfer device to the gateway device which identifies a specific one of the multiple control devices from which the fault code originated and pushes the machine-readable procedure to the specific one of the automobile control devices.

In another aspect of the present disclosure, a troubleshooting operation is performed, wherein the specific one of the automobile control devices performs the troubleshooting operation using the machine-readable procedure and data stored in a memory of the specific one of the automobile control devices corresponding to correct operating conditions of the at least one system or component.

In another aspect of the present disclosure, a troubleshooting result signal is generated by the specific one of the automobile control devices which is sent to the data transfer device.

In another aspect of the present disclosure, a remote cloud-based fault urgency assessment device is included, wherein upon receipt of the troubleshooting result signal the data transfer device converts the troubleshooting result signal to a wireless signal which is forwarded to the remote cloud-based fault urgency assessment device, the remote cloud-based fault urgency assessment device identifying if the troubleshooting result signal defines an urgent issue.

In another aspect of the present disclosure, if the urgent issue is identified, the fault urgency assessment device retrieves a customer notification saved in a memory which is directly related to the urgent issue and generates and forwards a customer notification to a display device of the vehicle such as a radio prompt, an email, a text message, an instant message or the like.

In another aspect of the present disclosure, the data transfer device converts the fault code into a transfer signal and forwards the transfer signal in wireless format as a signal fault code.

In another aspect of the present disclosure, the multiple machine-readable troubleshooting procedures mimic troubleshooting procedures available at a vehicle repair facility which require manual review by a repair technician to assess and repair the issue, but which have been predetermined to be able to be performed automatically without involvement by the repair technician.

According to several aspects, an automatic fault isolation and diagnosis system includes a cloud-based data system having multiple machine-readable troubleshooting procedures stored therein predetermined to be able to be performed automatically without involvement by a repair technician. A vehicle fault code is generated by one of multiple vehicle control devices of a vehicle platform, the fault code defining an issue with at least one system or component of the vehicle platform. A data transfer device within the vehicle platform receives the fault code and forwards the fault code to the cloud-based data system. The fault code is received and analyzed in the cloud-based data system to initially determine if the fault code is directed to and can be automatically corrected by one of the stored machine-readable troubleshooting procedures. A machine-readable procedure defines a copy of the one of the machine-readable troubleshooting procedures corresponding to the fault code together with the fault code. A gateway device is included, wherein the machine-readable procedure is transferred by the data transfer device to the gateway device which identifies a specific one of the multiple control devices from which the fault code originated and pushes the machine-readable procedure to the specific one of the automobile control devices.

In another aspect of the present disclosure, a troubleshooting operation is included, wherein the specific one of the automobile control devices performs the troubleshooting operation using the machine-readable procedure and data stored in a memory of the specific one of the automobile control devices corresponding to correct operating conditions of the at least one system or component.

In another aspect of the present disclosure, a troubleshooting result signal is generated by the specific one of the automobile control devices which is sent to the data transfer device.

In another aspect of the present disclosure, a remote cloud-based fault urgency assessment device is included, wherein upon receipt of the troubleshooting result signal the data transfer device converts the troubleshooting result signal to a wireless signal which is forwarded to the remote cloud-based fault urgency assessment device.

In another aspect of the present disclosure, a comparator identifies if the issue from which the fault code was generated defines a critical issue.

In another aspect of the present disclosure, if the critical issue further defines an urgent issue, the fault urgency assessment device retrieves a customer notification saved in a memory which is directly related to the urgent issue and generates and forwards a customer notification to a display device within the vehicle.

In another aspect of the present disclosure, the fault urgency assessment device also forwards a coded message to a vehicle repair facility, the coded message including the fault code together with a vehicle VIN information and the troubleshooting result signal.

According to several aspects, an automatic fault isolation and diagnosis system includes a cloud-based data system having multiple machine-readable troubleshooting procedures stored therein predetermined to be able to be performed automatically without involvement by a repair technician. A vehicle fault code is generated by one of multiple vehicle control devices of a vehicle platform, the fault code defining an issue with at least one system or component of the vehicle platform. A data transfer device within the vehicle platform receives the fault code and forwards the fault code to the cloud-based data system. The fault code is received and analyzed in the cloud-based data system to initially determine if the fault code is directed to and can be automatically corrected by one of the stored machine-readable troubleshooting procedures. A comparator generates a machine-readable procedure defining a copy of the one of the machine-readable troubleshooting procedures together with the fault code. A gateway device is included. The machine-readable procedure is transferred by the data transfer device to the gateway device which identifies a specific one of the multiple control devices from which the fault code originated and pushes the machine-readable procedure to the specific one of the automobile control devices. The specific one of the automobile control devices generates a troubleshooting result signal.

In another aspect of the present disclosure, a troubleshooting operation is performed by the specific one of the automobile control devices using the machine-readable procedure and data stored in a memory of the specific one of the automobile control devices corresponding to correct operating conditions of the at least one system or component used to generate the troubleshooting result signal.

In another aspect of the present disclosure, a remote cloud-based fault urgency assessment device is provided, wherein upon receipt of the troubleshooting result signal the data transfer device converts the troubleshooting result signal to a wireless signal which is forwarded to the remote cloud-based fault urgency assessment device. The fault urgency assessment device retrieves a customer notification saved in a memory and generates and forwards a customer notification to a display device within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
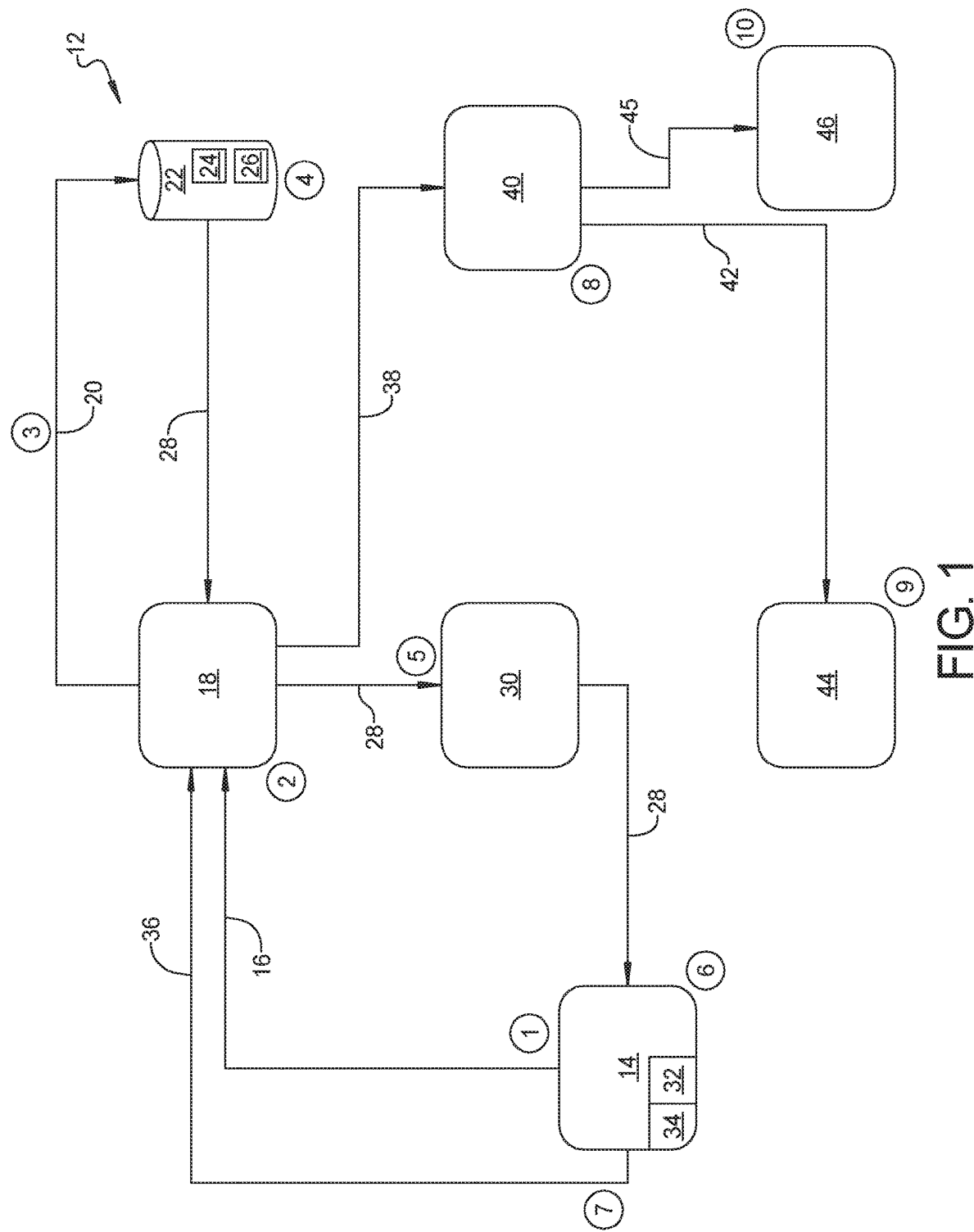
FIG. 1 is a diagrammatic presentation of an automatic fault isolation and diagnosis system according to an exemplary aspect.

Referring to FIG. 1, an automatic fault isolation and diagnosis system 12 provides communication for an automobile control device 14 such as an engine controller, a transmission controller, a control module or the like, to forward a vehicle fault code 16 to a data transfer device 18 such as a telematics module. The vehicle fault code 16 may be any one of multiple predetermined fault codes saved in a memory of the control device 14. The fault code 16 may be indicative of a component fault such as a fan or starter failure, a system fault such as a high coolant system temperature indication, an emission issue such as a high NOx level, or the like.

The fault code 16 when generated is forwarded to the data transfer device 18, which converts the fault code 16 into a transfer signal and forwards this in wireless format as a signal fault code 20 to a remote shared pool of configurable computer system resources and higher-level services, commonly defined as a cloud-based data system 22 accessible using the Internet. The cloud-based data system 22 stores multiple machine-readable troubleshooting procedures 24 which mimic troubleshooting procedures available at a vehicle repair facility and which require manual review by a repair technician to assess and repair the condition, but which have been predetermined to be able to be performed automatically without technician involvement. The signal fault code 20 is received and analyzed in the cloud-based data system 22 to initially determine if the signal fault code 20 is directed to and therefore can be automatically corrected by one of the stored machine-readable troubleshooting procedures 24. Upon identifying that one of one of the machine-readable troubleshooting procedures 24 is related to the signal fault code 20 a comparator 26 identifies if the issue from which the fault code 16 from which the signal fault code 20 was generated defines a critical issue. An issue is defined herein as "critical" if continued operation of the vehicle is impacted, requiring repair at a repair facility. If the signal fault code 20 and therefore the fault code 16 relates to a critical issue a copy of the one of the machine-readable troubleshooting procedures 24 together with the fault code 20 are returned as a machine-readable procedure 28 to the data transfer device 18.

The machine-readable procedure 28 is transferred by the data transfer device 18 to a gateway device 30 which communicates directly with the multiple control devices of a vehicle platform such as an automobile, a van, a sport utility vehicle, a light truck, an aircraft, a boat or ship and the like and identifies the specific control device from which the fault code 16 originated, in this example the control device 14. The gateway device 30 pushes the machine-readable procedure 28 to the automobile control device 14 which then performs a troubleshooting operation 32 using data stored in a memory 34 of the control device 14 corresponding to normal or correct operating conditions of the system. A troubleshooting result signal 36 is generated by the control device 14 which is sent to the data transfer device 18. An alternative is for the troubleshooting code as the machine-readable procedure 28 to run directly in the gateway device 30 for applications including vehicle subsystem diagnostics such as network diagnostics or component diagnostics.

Upon receipt of the troubleshooting result signal 36 the data transfer device 18 converts this to a wireless signal 38 which is forwarded to a remote cloud-based fault urgency assessment device 40. The function of the fault urgency assessment device 40 is to identify if the troubleshooting result signal 36 defines an urgent issue, for example an issue requiring the vehicle operator to immediately stop operation of the vehicle, or to urgently return the vehicle to a repair facility. If an urgent issue is identified, the fault urgency assessment device 40 retrieves a customer notification 42 saved in a memory which is directly related to the urgent issue and forwards the customer notification 42 to a display device 44 within the vehicle such as a vehicle radio in the form of a radio prompt, an email, a text message, an instant message or the like, or remotely such as to a customer computer or cell phone for example by a text message, a phone call, an instant message, or the like, where a visual instruction together with an optional audible instruction is available to the vehicle operator. According to several aspects, the fault urgency assessment device 40 also forwards a coded message 45 to a vehicle repair facility 46 such as a vehicle dealership. The coded message provides similar information as the fault code 16 together with vehicle identification number (VIN) information and results of the troubleshooting operation such as recommended repair parts, if necessary, to be retrieved or ordered by the vehicle repair facility 46.

If the issue analyzed by the fault urgency assessment device 40 is deemed to be a non-urgent issue, the fault urgency assessment device 40 retrieves a second or different customer notification 42 saved in the memory which is directly related to the non-urgent issue and forwards the customer notification 42 to the display device 44 such as a vehicle radio where a visual instruction together with an optional audible instruction is available to the vehicle operator. The customer notification 42 may in this example be a notification that an appointment with the repair facility 46 should be made at the next convenient time or at the next scheduled maintenance event to review and correct the non-urgent issue.

Multiple process steps 1-10 are identified in FIG. 1. In a Step 1 a vehicle fault code 16 is generated by the control device 14. In a Step 2 the vehicle fault code 16 is forwarded to a data transfer device 18. In a Step 3 the fault code 16 converted in the data transfer device 18 to a signal fault code 20 which is wirelessly sent to a cloud-based data system 22. In a Step 4 the signal fault code 20 is analyzed in the cloud-based data system 22 by a comparator 26 to identify if the issue from which the signal fault code 20 and therefore the fault code 16 was generated defines a critical issue. If a critical issue is identified, in a Step 5 a copy of the one of the machine-readable troubleshooting procedures 24 together with the fault code 20 are returned as a machine-readable procedure 28 to the data transfer device 18. In a Step 6 the machine-readable procedure 28 is forwarded to the control device 14 which originally generated the fault code 16. In a step 7 the control device 14 performs a troubleshooting operation and forwards a troubleshooting result signal 36 to the data transfer device 18.

In a step 8 the data transfer device 18 converts the troubleshooting result signal 36 to a wireless signal 38 which is forwarded to a remote cloud-based fault urgency assessment device 40, which identifies if the wireless signal 38 relates to an urgent issue. In a Step 9 if the wireless signal 38 relates to an urgent issue a customer notification 42 is sent to a display device 44 in the vehicle platform to visually and optionally to audibly notify the operator of the vehicle platform of the urgent issue. In a Step 10 if the wireless signal 38 relates to an urgent issue a coded message 45 is also sent to a vehicle repair facility 46 which provides information related to the urgent issue, the vehicle platform VIN and information related to items requiring repair and/or ordering.

Figure 2:
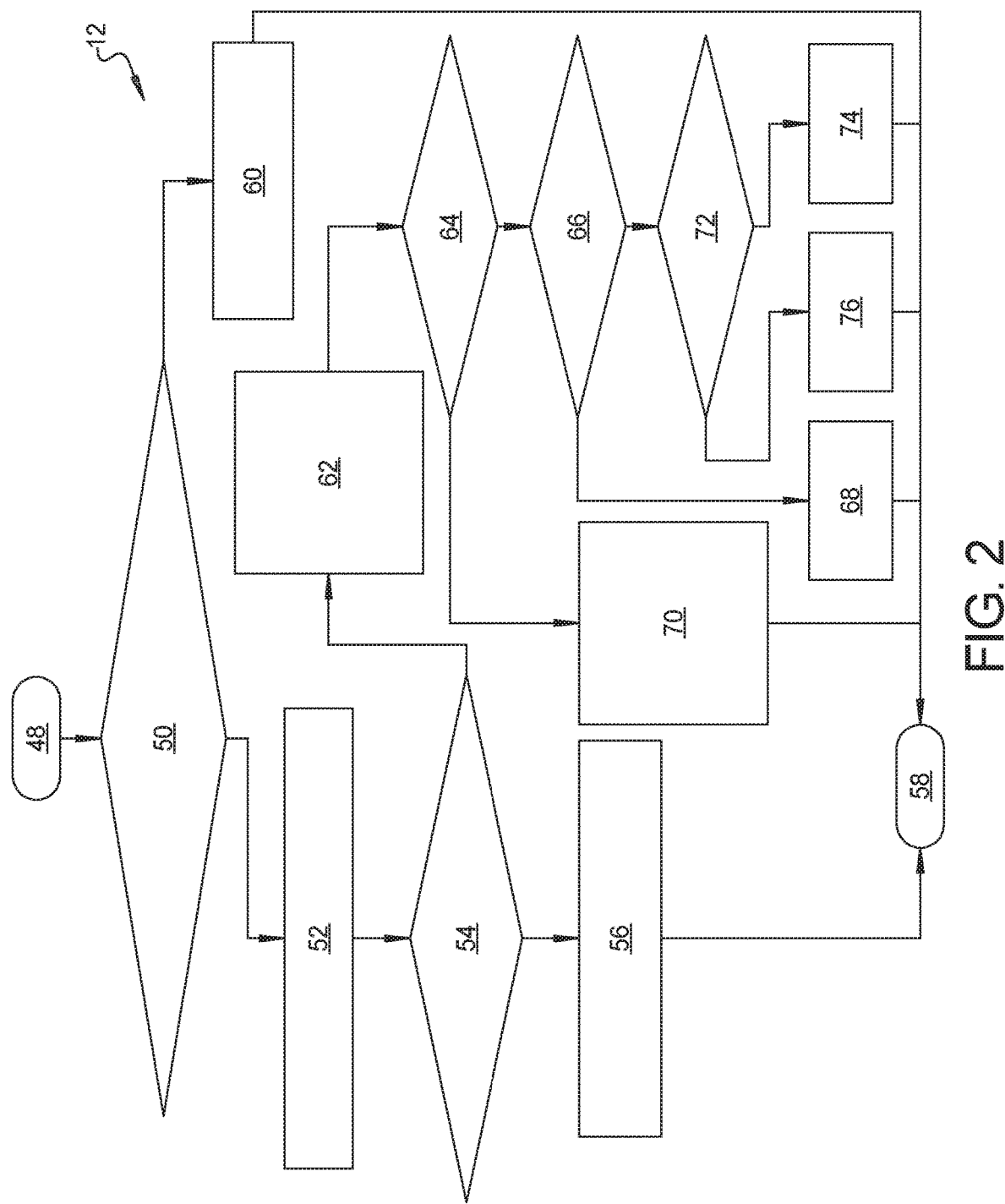
FIG. 2 is a flow diagram of an exemplary fault isolation algorithm for the automatic fault isolation and diagnosis system of FIG. 1.

Referring to FIG. 2 and again to FIG. 1, an exemplary fault isolation algorithm for the automatic fault isolation and diagnosis system 12 can be performed as follows. The algorithm begins at a begin step 48. In a time lapse step 50 recorded data is read such as a cranking voltage, a current and an engine revolution per minute (RPM). The time lapse step is performed to determine if the recorded data is for a predetermined calibratable time period of greater than a predetermined time period such as X2 seconds. The calibratable time period may be a default value, for example X2 seconds with X2=5 by default. If the result from the time lapse step 50 is YES, in a step 52 a transient effect in the recorded data is eliminated by removing the first and last X3 seconds of data, where X3 may for example be a default value such as X3=2 seconds.

In a following limit step 54 limits are applied to the cranking voltage and the RPM values. For example, the cranking voltage limit may be all cranking voltage must be greater than or equal to X4 volts, where a calibratable value may be a default value, for example X4=11 volts. Also, for example, the RPM limit can be that all RPM=0.

If the result of the limit step 54 is YES, meaning that the recorded data meets or exceeds the limit step 54 limits of cranking voltage and RPM, in a first conclusion step 56 a conclusion is drawn that the starter is not powered, and a starter power fault code is generated. The starter power fault code will relay requests to check for open faults for each of a starter enable relay/wire, a solenoid, a starter power-ground, and a starter motor coil open.

Following the step 56 and generation of the starter power fault code the program ends at a program end 58.

Returning to the time lapse step 50 if the result from the time lapse step 50 is NO, in a first conclusion step 60 a conclusion is drawn that the issue is one of an electronic control module (ECM) disabled starter, or the issue is a data collection and transfer issue. Following the conclusion drawn in step 60 a fault code is generated and the program ends at the program end 58.

Returning to the limit step 54, if the result from the limit step 54 is NO, meaning that the recorded data does not meet the limit step 54 limits, in a battery check step 62 a battery open circuit voltage (Voc) is derived from a mapping table based on a battery state-of-charge and a battery temperature. A battery and starter resistance ratio (R) is than calculated using the equation:

$$R = Voc/V \min -1.$$

Following the battery check step 62 a range step 64 is then performed. The range step 64 determines if the battery starter resistance ratio R is normal, defined as being within a predefined range saved in a memory.

If the result from the range step 64 is YES, meaning the battery starter resistance ratio R is normal, an engine RPM increase step 66 is performed with an engine RPM increase requested and the RPM of the recorded data is compared to a second RPM limit defined as RPM greater than or equal to X5, where X5 may for example be a default value such as X5=160 RPM.

If the result from the engine RPM increase step 66 is YES, in a second conclusion step 68 a conclusion is drawn that the issue is an engine or fuel delivery system fault, and an engine/fuel delivery system fault code is generated. Following the conclusion drawn in the second conclusion step 68 the program ends at the program end 58.

If the result from the range step 64 is NO, meaning the battery starter resistance ratio R is outside of the range defined as normal, in a third conclusion step 70 the corresponding fault is determined as either a battery low condition defined as a SoC high resistance; or starter motor short is determined based on a starter motor high resistance. Either a battery low fault code or a starter motor short fault code is generated and the program ends at the program end 58.

If the result from the engine RPM increase step 66 is NO, in a cranking current determination step 72 it is determined if an average cranking current is greater than or equal to a cranking current limit defined as a cranking current greater than or equal to X6, where X6 ampere hours, or X6 may for example be a predetermined calibratable high torque value.

If the result from the cranking current determination step 72 is YES, in a fourth conclusion step 74 a conclusion is drawn that the issue is the engine has seized due to high friction and an engine seized fault code is generated. Following the conclusion drawn in the fourth conclusion step 74 the program ends at the program end 58.

If the result from the cranking current determination step 72 is NO, in a fifth conclusion step 76 a conclusion is drawn that the issue is a pinion, clutch, or flywheel problem exists or the starter has a weak magnetic field. The appropriate fault code is generated. Following the conclusion drawn in the fifth conclusion step 76 the program ends at the program end 58.

With continuing reference to FIG. 2 and again to FIG. 1, when any of the fault codes described in reference to FIG. 2 is generated by the relevant control device 14, the fault code is handled as described in reference to FIG. 1 and the customer notification 42 is generated, together with the coded message 45 to the vehicle repair facility 46 as necessary.

A cloud-based data base is used to store vehicle safety and time important machine-readable scripted diagnosis troubleshooting procedures. The present methodology utilizes a cloud-based over-the-air update to send scripted diagnostic troubleshooting procedures for issues that can be automatically troubleshooted in the vehicle. The machine-readable algorithms script procedure executes the diagnostic troubleshooting onboard the vehicle and ultimately identifies failed parts of a component. The software in-vehicle system generates a fault test report included in a predefined fault code and sends the test report results to a back-office to determine failure severity and if the results relate to a critical issue. In the event of time important faults occurring, a customer facing alert is sent to a vehicle driver and to a vehicle service center.

An automatic fault isolation and diagnosis system of the present disclosure offers several advantages. These include provision of a machine-readable algorithm script procedure that executes a diagnostic troubleshoot onboard the vehicle and ultimately isolates the problem to specific failed parts of a component. A software in-vehicle system generates a fault test report included in a fault code and sends the results to a back office to determine failure severity and criticality. In an critical issue fault as defined herein is identified, a customer facing alert is sent to the driver and to the service center.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automatic fault isolation and diagnosis system, comprising:
   a cloud-based data system having multiple machine-readable troubleshooting procedures stored therein, the cloud-based data system being an internet accessible remote shared pool of configurable computer system resources;
   a vehicle fault code generated by one of multiple vehicle control devices of a vehicle platform, the fault code defining an issue with at least one system or component of the vehicle platform, the fault code being generated when a fault isolation algorithm is performed and a conclusion is drawn that one of a vehicle starter is not powered or an electronic control module (ECM) starter is disabled, the fault isolation algorithm comprising:
      reading recorded data of a cranking voltage, a current and an engine revolution per minute (RPM);
      after reading the recorded data, determining that the recorded data is for a predetermined calibratable time period greater than a predetermined time period;
      eliminating a transient effect in the recorded data if the recorded data is greater than the predetermined time period;
      applying limits to the cranking voltage and the RPM of the recorded data;
      if the recorded data meets or exceeds limits applied to the cranking voltage and the RPM, generating the vehicle fault code drawn to the vehicle starter not being powered;
      if the record data does not meet or exceed limits applied to the cranking voltage and the RPM, generating the vehicle fault code drawn to the ECM starter being disabled;
   a data transfer device within the vehicle platform receiving the fault code and forwarding the fault code to the cloud-based data system, the fault code received and analyzed in the cloud-based data system to initially determine if the fault code is directed to and can be automatically corrected by one of the stored machine-readable troubleshooting procedures; and
   a comparator, wherein if one of the machine-readable troubleshooting procedures is related to the fault code the comparator identifies if the issue from which the fault code was generated defines a critical issue;

a machine-readable procedure defining a copy of the one of the machine-readable troubleshooting procedures together with the fault code created if the fault code defines the critical issue, the machine-readable procedure forwarded to the data transfer device by the comparator; and a gateway device, wherein the machine-readable procedure is transferred by the data transfer device to the gateway device which identifies a specific one of the multiple control devices from which the fault code originated and pushes the machine-readable procedure to the specific one of the automobile control devices, wherein the troubleshooting procedures, including assessment and repair, are predetermined to be able to be performed automatically without technician involvement.

2. The automatic fault isolation and diagnosis system of claim 1, further including a troubleshooting operation, wherein the specific one of the automobile control devices performs the troubleshooting operation using the machine-readable procedure and data stored in a memory of the specific one of the automobile control devices corresponding to correct operating conditions of the at least one system or component.

3. The automatic fault isolation and diagnosis system of claim 2, further including a troubleshooting result signal generated by the specific one of the automobile control devices which is sent to the data transfer device.

4. The automatic fault isolation and diagnosis system of claim 3, further including a remote cloud-based fault urgency assessment device, wherein upon receipt of the troubleshooting result signal the data transfer device converts the troubleshooting result signal to a wireless signal which is forwarded to the remote cloud-based fault urgency assessment device, the remote cloud-based fault urgency assessment device identifying if the troubleshooting result signal defines an urgent issue.

5. The automatic fault isolation and diagnosis system of claim 4, wherein if the urgent issue is identified, the fault urgency assessment device retrieves a customer notification saved in a memory which is directly related to the urgent issue and generates and forwards a customer notification to a display device within the vehicle.

6. The automatic fault isolation and diagnosis system of claim 1, wherein the data transfer device converts the fault code into a transfer signal and forwards the transfer signal in wireless format as a signal fault code.

7. The automatic fault isolation and diagnosis system of claim 1, wherein the multiple machine-readable troubleshooting procedures mimic troubleshooting procedures available at a vehicle repair facility which require manual review by a repair technician to assess and repair the issue, but which have been predetermined to be able to be performed automatically without involvement by the repair technician.

8. An automatic fault isolation and diagnosis system, comprising:
a cloud-based data system having multiple machine-readable troubleshooting procedures stored therein predetermined to be able to be performed automatically without involvement by a repair technician, the cloud-based data system being an internet accessible remote shared pool of configurable computer system resources;

a vehicle fault code generated by one of multiple vehicle control devices of a vehicle platform, the fault code defining an issue with at least one system or component of the vehicle platform, the fault code being generated when a fault isolation algorithm is performed and a conclusion is drawn that one of a vehicle starter is not powered or an electronic control module (ECM) starter is disabled, the fault isolation algorithm comprising:

reading recorded data of a cranking voltage, a current and an engine revolution per minute (RPM);

after reading the recorded data, determining that the recorded data is for a predetermined calibratable time period greater than a predetermined time period;

eliminating a transient effect in the recorded data if the recorded data is greater than the predetermined time period;

applying limits to the cranking voltage and the RPM of the recorded data;

if the recorded data meets or exceeds limits applied to the cranking voltage and the RPM, generating the vehicle fault code drawn to the vehicle starter not being powered;

if the record data does not meet or exceed limits applied to the cranking voltage and the RPM, generating the vehicle fault code drawn to the ECM starter being disabled;

a data transfer device within the vehicle platform receiving the fault code and forwarding the fault code to the cloud-based data system, the fault code received and analyzed in the cloud-based data system to initially determine if the fault code is directed to and can be automatically corrected by one of the stored machine-readable troubleshooting procedures;

a machine-readable procedure defining a copy of the one of the machine-readable troubleshooting procedures corresponding to the fault code together with the fault code;

a gateway device, wherein the machine-readable procedure is transferred by the data transfer device to the gateway device which identifies a specific one of the multiple control devices from which the fault code originated and pushes the machine-readable procedure to the specific one of the automobile control devices; and a troubleshooting operation, wherein the specific one of the automobile control devices performs the troubleshooting operation using the machine-readable procedure and data stored in a memory of the specific one of the automobile control devices corresponding to correct operating conditions of the at least one system or component, wherein the troubleshooting procedures, including assessment and repair, are predetermined to be able to be performed automatically without technician involvement.

9. The automatic fault isolation and diagnosis system of claim 8, further including a troubleshooting result signal generated by the specific one of the automobile control devices which is sent to the data transfer device.

10. The automatic fault isolation and diagnosis system of claim 9, further including a remote cloud-based fault urgency assessment device, wherein upon receipt of the troubleshooting result signal the data transfer device converts the troubleshooting result signal to a wireless signal which is forwarded to the remote cloud-based fault urgency assessment device.

11. The automatic fault isolation and diagnosis system of claim 10, further including a comparator, wherein the comparator identifies if the issue from which the fault code was generated defines a critical issue.

12. The automatic fault isolation and diagnosis system of claim 11, wherein if the critical issue further defines an urgent issue, the fault urgency assessment device retrieves a customer notification saved in a memory which is directly related to the urgent issue and generates and forwards a customer notification to a display device within the vehicle.

13. The automatic fault isolation and diagnosis system of claim 12, further including a coded message forwarded by the fault urgency assessment device to a vehicle repair facility, the coded message including the fault code together with a vehicle VIN information and the troubleshooting result signal.

14. An automatic fault isolation and diagnosis system, comprising:
   a cloud-based data system having multiple machine-readable troubleshooting procedures stored therein predetermined to be able to be performed automatically without involvement by a repair technician, the cloud-based data system being an internet accessible remote shared pool of configurable computer system resources;
   a vehicle fault code generated by one of multiple vehicle control devices of a vehicle platform, the fault code defining an issue with at least one system or component of the vehicle platform, the fault code being generated when a fault isolation algorithm is performed and a conclusion is drawn that one of a vehicle starter is not powered or an electronic control module (ECM) starter is disabled, the fault isolation algorithm comprising:
      reading recorded data of a cranking voltage, a current and an engine revolution per minute (RPM);
      after reading the recorded data, determining that the recorded data is for a predetermined calibratable time period greater than a predetermined time period;
      eliminating a transient effect in the recorded data if the recorded data is greater than the predetermined time period;
      applying limits to the cranking voltage and the RPM of the recorded data;
      if the recorded data meets or exceeds limits applied to the cranking voltage and the RPM, generating the vehicle fault code drawn to the vehicle starter not being powered;
      if the record data does not meet or exceed limits applied to the cranking voltage and the RPM, generating the vehicle fault code drawn to the ECM starter being disabled;
   a data transfer device within the vehicle platform receiving the fault code and forwarding the fault code to the cloud-based data system, the fault code received and analyzed in the cloud-based data system to initially determine if the fault code is directed to and can be automatically corrected by one of the stored machine-readable troubleshooting procedures;
   a comparator generating a machine-readable procedure defining a copy of the one of the machine-readable troubleshooting procedures together with the fault code;
   a gateway device, wherein the machine-readable procedure is transferred by the data transfer device to the gateway device which identifies a specific one of the multiple control devices from which the fault code originated and pushes the machine-readable procedure to the specific one of the automobile control devices, wherein the specific one of the automobile control devices generates a troubleshooting result signal; and
   a troubleshooting operation performed by the specific one of the automobile control devices using the machine-readable procedure and data stored in a memory of the specific one of the automobile control devices corresponding to correct operating conditions of the at least one system or component used to generate the troubleshooting result signal,
   wherein the troubleshooting procedures, including assessment and repair, are predetermined to be able to be performed automatically without technician involvement.

15. The automatic fault isolation and diagnosis system of claim 14, further including:
   a remote cloud-based fault urgency assessment device, wherein upon receipt of the troubleshooting result signal the data transfer device converts the troubleshooting result signal to a wireless signal which is forwarded to the remote cloud-based fault urgency assessment device; and
   the fault urgency assessment device retrieves a customer notification saved in a memory and generates and forwards a customer notification to a display device within the vehicle platform.

* * * * *